US012768703B2

(12) United States Patent
Wechselberger et al.

(10) Patent No.: US 12,768,703 B2
(45) Date of Patent: Oct. 20, 2026

(54) WEIGHING SYSTEM FOR A LADLE TRANSFER CAR

(71) Applicant: Mettler-Toledo, LLC, Columbus, OH (US)

(72) Inventors: Eric V. Wechselberger, Powell, OH (US); Jonathon Berger, Worthington, OH (US)

(73) Assignee: Mettler-Toledo, LLC, Columbus, OH (US)

( * ) Notice: Subject to any disclaimer, the term of this patent is extended or adjusted under 35 U.S.C. 154(b) by 351 days.

(21) Appl. No.: 18/683,920

(22) PCT Filed: Aug. 31, 2021

(86) PCT No.: PCT/US2021/048394
§ 371 (c)(1),
(2) Date: Feb. 15, 2024

(87) PCT Pub. No.: WO2023/033800
PCT Pub. Date: Mar. 9, 2023

(65) Prior Publication Data
US 2024/0426648 A1 Dec. 26, 2024

(51) Int. Cl.
*G01G 19/04* (2006.01)
*G01G 21/28* (2006.01)

(52) U.S. Cl.
CPC ........... *G01G 19/042* (2013.01); *G01G 21/28* (2013.01)

(58) Field of Classification Search
CPC ....... G01G 19/04; G01G 19/042; G01G 21/28
See application file for complete search history.

(56) References Cited

U.S. PATENT DOCUMENTS 2,673,082 A * 3/1954 Thurston ................ G01G 19/04 177/255
2,716,547 A * 8/1955 Thurston .............. G01G 19/045 177/1
(Continued)

FOREIGN PATENT DOCUMENTS

CN 201707119 U 1/2011
CN 104568092 A * 4/2015
(Continued)

OTHER PUBLICATIONS

Avery Weigh-Tronix, RLP Legal-for-Trade Railroad Track Scales—Avery Weigh-Tronix, www.standardscale.com/Railroad Track Scales/Avery_Weigh-Tronix/AW-T_RLP_Legal-for-Trade_Railroad_Track_Scales.html, URL accessed May 28, 2021, 2014, 2 pages.
(Continued)

*Primary Examiner* — Natalie Huls
(74) *Attorney, Agent, or Firm* — Standley Law Group LLP; Jeffrey S. Standley; Adam J. Smith

(57) ABSTRACT

A weighbridge for weighing a ladle transfer car has a foundation pit, a weighing platform, and a plurality of load cells. The foundation pit has a base and the weighing platform, positioned in the foundation pit, bears upon the base. The plurality of load cells are arranged in the foundation pit to collectively bear the weight of the weighing platform. A characterizing feature of the weighbridge is that, during use, the foundation pit contains a liquid, with a level that is maintained to at least partially submerge each of the load cells.

14 Claims, 2 Drawing Sheets

(56) References Cited

U.S. PATENT DOCUMENTS

| | | | | | |
|---|---|---|---|---|---|
| 3,192,535 | A | * | 6/1965 | Watson | G01G 3/147<br>177/12 |
| 3,421,593 | A | * | 1/1969 | Buchman | G01G 19/04<br>177/163 |
| 3,679,011 | A | * | 7/1972 | Hawver | G01G 19/047<br>177/163 |
| 3,747,715 | A | * | 7/1973 | Nordstrom | G01G 19/04<br>177/163 |
| 4,036,315 | A | * | 7/1977 | Flinth | G01G 19/04<br>177/163 |
| 4,134,464 | A | * | 1/1979 | Johnson | G01G 19/047<br>177/163 |
| 4,878,551 | A | | 11/1989 | Watkins et al. | |
| 7,241,956 | B1 | | 7/2007 | Stimpson | |
| 2006/0111868 | A1 | * | 5/2006 | Beshears | G01G 19/02<br>702/173 |
| 2011/0250038 | A1 | | 10/2011 | Affleck | |
| 2012/0048627 | A1 | | 3/2012 | Insana et al. | |

FOREIGN PATENT DOCUMENTS

| | | | | | |
|---|---|---|---|---|---|
| CN | 108020305 | A | * | 5/2018 | G01G 19/04 |
| CN | 208568051 | U | | 3/2019 | |
| CN | 110388974 | A | | 10/2019 | |
| CN | 110595590 | A | * | 12/2019 | G01G 19/06 |
| CN | 212513270 | U | * | 2/2022 | |
| DE | 3641572 | A1 | * | 6/1988 | G01G 23/01 |
| EP | 0338553 | A2 | | 10/1989 | |
| EP | 0422289 | A1 | * | 4/1991 | G01G 19/02 |
| GB | 2076978 | A | * | 12/1981 | G01G 21/22 |
| RU | 174425 | U1 | * | 10/2017 | |
| RU | 179284 | U1 | | 5/2018 | |

OTHER PUBLICATIONS

B-Tek Scales LLC, Rail Track Scales, https://www.b-tek.com/rail-track-scales-railscale-group-group, URL accessed May 28, 2021, 3 pages.

Köster, V. et al., Operating experience with a single arm ladle furnace, Steel Times International, Jan. 14, 1990, 2 pages, vol. 14, No. 1.

Rus, D., Mixed road-rail weighbridges FLINTAB, en.flintab.ro/mixed-road-rail-weighbridges/photo-album/page-1, URL accessed May 28, 2021, 1 page.

* cited by examiner

WEIGHING SYSTEM FOR A LADLE TRANSFER CAR

TECHNICAL FIELD

The disclosed invention relates to a weighing system adapted to obtain a weighment of a railcar that transfers molten pig iron in a ladle.

BACKGROUND ART

As part of the steel making process at a typical mill, molten pig iron must be transported from the blast furnace to a basic oxygen furnace. Density and temperature make the molten pig iron very difficult to transport, even over a short distance. One known method of transporting molten pig iron is by a ladle transfer car.

A ladle transfer car is a specialized railroad car adapted to receive a ladle full of the molten metal. The railroad car comprises at least two truck assemblies, each of the truck assemblies having at least one axle bar that extends horizontally beneath the truck assembly. Each axle bar has a set of steel wheels, spaced apart for riding on steel tracks. The truck assemblies support a carriage. In some cases, the ladle has a pair of trunnions that are removably received in the carriage, so that a ladle full of molten metal is placed onto the carriage. In other cases, the ladle is more permanently mounted to the carriage with a rotating bearing and the molten pig iron is poured into the ladle while it is positioned on the rail car. In either case, the ladle portion has a thick metal body that is lined with firebrick, and it becomes extremely hot when filled with the molten pig iron, which has a temperature in the range of 1,400°-1,500° C. (2,550° to 2,700° F.). After being loaded, the ladle transfer car must be shuttled quickly to the basic oxygen furnace before the pig iron begins to cool and solidify. Once at the basic oxygen furnace, the pig iron is transferred from the ladle transfer car. A fully loaded ladle transfer car can weigh over 270,000 kg (600,000 lb).

During the transportation or pouring process, it is desirable to weigh the ladle transfer car to determine exactly how much molten pig iron it contains. While a general estimate may be made, based on the size of the ladle or the amount of charge to the blast furnace, an accurate weighment is important to determine the correct amount of alloying elements required to be added to produce a specific type of steel. Improper alloy additions can lead to scrapping or rejecting an entire batch. Furthermore, knowing the weight of the molten pig iron helps to ensure the proper amount of metal is poured into individual molds. If the amount of pig iron remaining in the ladle will be insufficient to fill a mold, the remaining metal may be recycled back into the furnace, thereby avoiding the cost of reheating the metal and other related production expenses.

One known solution for weighing a ladle transfer car is found in U.S. Pat. No. 4,878,551 to Watkins, et al., in which the weighing system is built into the ladle transfer car. In particular, a plurality of shear beam load cell pins connect a car body to a plurality of rail truck assemblies.

Another solution of the same nature is found in U.S. Pat. No. 7,241,956 to Stimpson, where specially-designed heat resistant load cells are fitted into a top of an axle block and a top of an axle block housing of the ladle transfer car.

These solutions have a number of disadvantages, such as requiring each ladle transfer car to be provided with load cells in proximity to the heat of the molten metal.

Another known solution for weighing railcars, in general, is to use a weighbridge at the point of loading or of emptying the railcar, using a rail weighbridge having a sufficiently high capacity. In the case of molten metal, the inherent heat at the blast furnace and the basic oxygen furnace make this impractical.

It is therefore an unmet objective of the prior art to make an accurate weighment of a fully loaded ladle transfer car during the transport from the blast furnace to the basic oxygen furnace.

SUMMARY

This and other objectives are met by a weighbridge and a method for using a weighbridge to weigh a ladle transfer car.

In at least one embodiment, a weighbridge for weighing a ladle transfer car comprises a foundation pit; a weighing platform; and a plurality of load cells. The foundation pit has a base and the weighing platform, positioned in the foundation pit, bears upon the base. The plurality of load cells are arranged in the foundation pit to collectively bear the weight of the weighing platform. A characterizing feature of the weighbridge is that, during use, the foundation pit contains a liquid, with a level that is maintained to at least partially submerge each of the load cells.

In many of these embodiments, the liquid in the foundation pit is water.

The load cells used are adapted for submersible use in the liquid.

In many embodiments, the level of liquid in the foundation pit is maintained below a bottom surface of the weighing platform.

The preferred embodiments of the inventive concept has load cells that provide a digital output signal.

Many of the embodiments will also include a terminal that is in electronic communication with each of the load cells for receiving the digital output signals for processing and for controlling the weighing functions. In these situations, it is preferred for the electronic communication to be wireless.

In many embodiments, the weighing platform will comprise a roadway sized to receive the entire weight of the ladle transfer car; at least one set of beams upon which the roadway is supported; and a plurality of vertical posts positioned between the at least one set of beams and the base of the foundation pit to support the weighing platform. In such an embodiment, each of the vertical posts has at least one of the plurality of load cells associated with it. Further, the weighbridge has an upper surface of the roadway arranged in the foundation pit at grade level for receiving the ladle transfer car being weighed. And, particularly, there may be a pair of rails, recessed in the roadway, for receiving the ladle transfer car when the ladle transfer car is a rail car.

Some of the embodiments will also include a system for filling, draining and maintaining the quality and quantity of the liquid in the foundation pit.

In another embodiment, a weighing system for weighing a ladle transfer car having at least a fore truck assembly and a rear truck assembly is provided, where each truck assembly has at least one axle bar with a pair of steel wheels. Such a weighbridge comprises a fore weighing platform and a rear weighing platform, spaced apart to correspond to a spacing between the fore truck assembly and rear truck assembly; a fore foundation pit and a rear foundation pit, each having a base and associated with a respective weighing platform; a plurality of load cells associated with each of the weighing platforms, each of the load cells arranged below the associated weighing platform between a bottom surface of the weighing platform and the base of the associated foundation pit to measure the weight borne by the base from the weighing platform, the weighbridge characterized by each foundation pit containing a liquid, with a level of the liquid during use being maintained to fully or at least partially submerge each of the load cells.

In some of these embodiments, the fore foundation pit and rear foundation pit are in selective liquid communication.

Even further objectives are achieved by a method for weighing a ladle transfer car, having the steps of:

- providing a weighbridge having a foundation pit with a base, at least one weighing platform positioned in the foundation pit such that the weight of each weighing platform bears on the base, and a plurality of submersible load cells, arranged to collectively receive the total weight of all of the weighing platforms, wherein the foundation pit contains a liquid, preferably water, of sufficient depth to at least partially submerge each of the load cells;
- moving a ladle transfer car bearing a load of molten metal onto the weighbridge so that the entire weight of the loaded ladle transfer car is borne by the plurality of the load cells;
- transmitting an output signal from each of the plurality of load cells to a terminal remote from the weighbridge; and
- calculating, at the remote terminal, a weight of the molten metal in the loaded ladle transfer car based upon a weight of the ladle transfer car when not loaded.

BRIEF DESCRIPTION OF THE DRAWINGS

A better understanding of the inventive concept will be obtained by reference to the appended drawings, wherein identical parts are identified with identical reference numbers and wherein.

DETAILED DESCRIPTION OF THE EMBODIMENTS

Weighing a fully loaded ladle transfer car is challenging due to its high weight and extreme temperature. In particular, the extreme temperature affects the weighing accuracy of the load cells and causes premature failures. Load cells are made of steel which expands when heated. This thermal expansion affects the weighing accuracy of load cells, so they are temperature compensated for this reason. The effectiveness of this temperature compensation is reduced when the temperature change is rapid and the temperature distribution in the load cell is not uniform. Furthermore, components inside the load cell, such as strain gauges, wires, connectors, and electronic components (in the case of digital load cells), are also temperature sensitive. These components may be damaged by exposure to high temperature and cause a load cell to fail. Special load cells designed for high temperature applications may be used to help improve the reliability. These special load cells are expensive. Other external methods may also be used to insulate the load cells from the environment.

Figure 1:
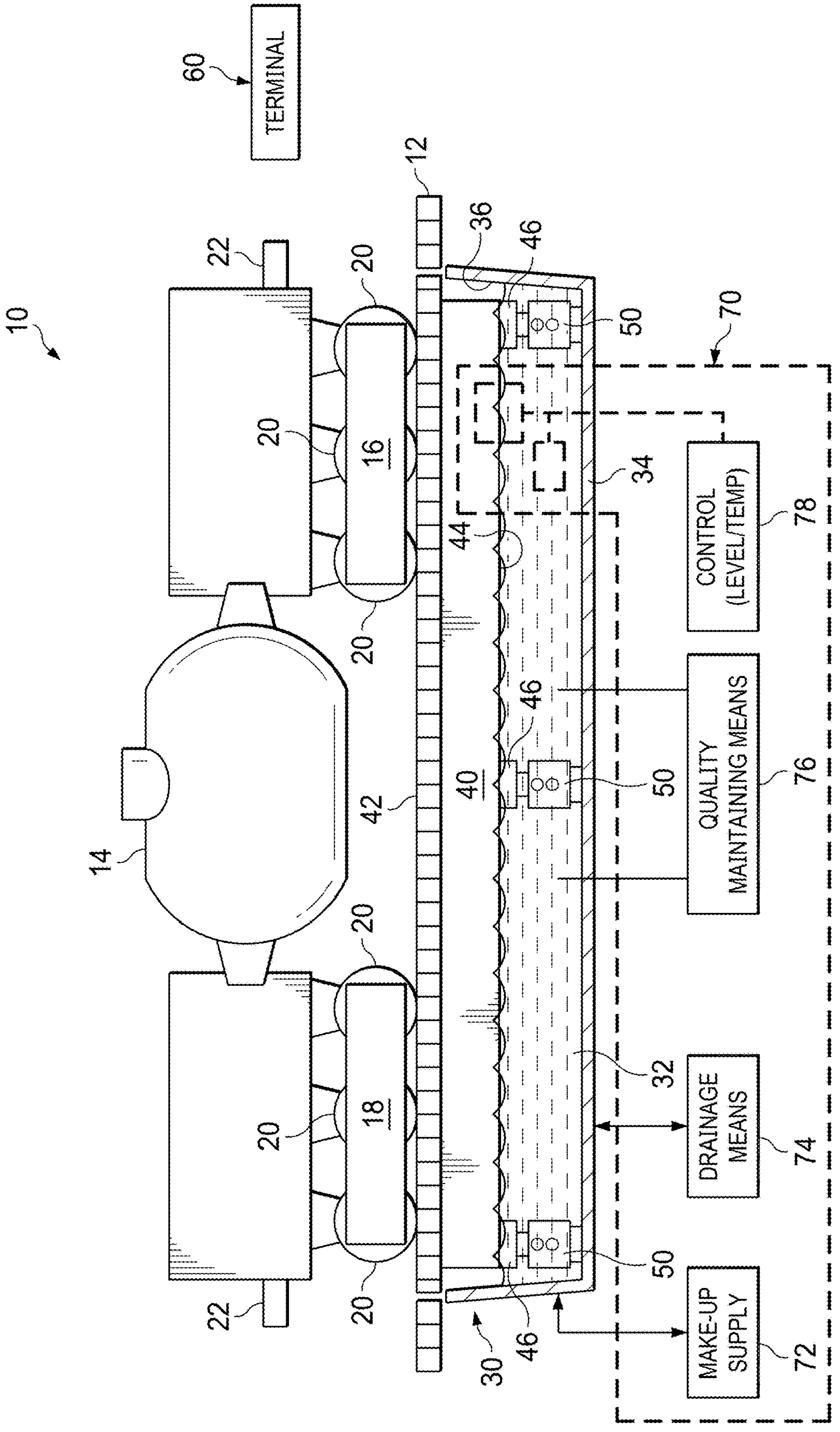
FIG. 1 is a side elevation view of a ladle transfer car, as known in the prior art, passing across a first embodiment of a weighbridge incorporating the inventive concept.

FIG. 1 presents a side elevation view of an exemplary ladle transfer car 10, as known in the art, passing on a conventional railway 12 across a weighbridge of the inventive concept. The depicted embodiment shows a ladle 14, that is mounted for rotation about a longitudinal axis of the transfer car 10, for emptying the contents of the ladle. In other embodiments, a ladle portion of the car may be removably placed onto a receiving portion on a body of the transfer car 10. It will be understood that the specifics of how the ladle is held on the transfer car are not critical to the inventive concept, because almost any ladle car design will position the ladle centrally along the overall length and breadth of the transfer car 10. The depicted transfer car 10 has a first and a second truck assembly 16, 18, each of which is provided with at least one axle assembly 20, and, in many embodiments, with more than one axle assembly, due to the weight being borne. The respective truck assemblies 16, 18 are preferably of conventional design, as known in the industry, and are positioned near the first and second ends of the transfer car 10. Generally, there will be no truck assembly under the ladle portion 14. Each axle assembly 20 has an axle connecting a pair of spaced-apart steel wheels mounted for rotation on the railway 12. Each truck assembly 16, 18 in FIG. 1 has three axle assemblies 20. Conventional railway couplings 22 are provided at each end of the ladle transfer car 10 to allow it to be coupled to an adjacent transfer car or engine. The normal amount of play provided in three-dimensions by the coupling 22 permits a transfer car 10 to be weighed while it is connected on either or both ends or while unconnected at either end.

In the inventive concept, a weighbridge is provided that insulates and cools the load cells in the system by which ladle transfer cars are weighed, improving the weighing accuracy as well as the reliability and availability of the weighbridge.

FIG. 1 shows a first embodiment of the weighbridge 30. A foundation pit 32 having a base 34 is provided along a portion of a railway track 12 over which ladle transfer cars 10 will pass. The foundation pit 32 is positioned below grade level so that a weighing platform 40 in the foundation pit 32 is in alignment with the approaches to the weighing platform from each direction of the railway track 12. The base 34 should be flat. It is very desirable to have side walls 36 that are nearly vertical, or, as shown in the figures, extend slightly outwardly from the base 34 to the top of the pit 32.

In use, the foundation pit 32 contains a pool of liquid, preferably water. Consequently, it may be desirable in many embodiments to have a foundation pit 32 that is deeper than what would be used in prior art designs. At least one reason is the inherently high heat capacity of the water to operate as a heat sink for radiant energy emitted from the ladle transfer car 10. This factor, as well as the liquid volume, minimizes temperature changes in the liquid. Since the heat transferred to the weighbridge 30 only occurs during the period while the ladle transfer car 10 is being weighed, the temperature increase of the liquid is minimized. In some embodiments, it may be necessary to circulate the liquid through a heat exchanger, although it may be desirable to minimize circulation of the liquid.

Additional incentives 78 to provide control for the level and temperature of the liquid pool include a need to provide make-up liquid or remove excess liquid or to be able to drain the liquid entirely to provide access to submerged elements for maintenance. In many embodiments, there will be a system 70 provided for filling 72, draining 74 and maintaining the quality 76 and quantity of the liquid in the foundation pit 32, such as schematically illustrated at FIG. 1.

The presence of the liquid in the foundation pit 32 affects radiative heat transfer to any elements of the weighbridge that are positioned in the liquid. Infrared radiation is more strongly absorbed by water than radiation in the visible spectrum. It may, in some instances, also be desirable to place a further barrier to radiative heat transfer, as well as evaporation, at the surface of the liquid. One such solution is a floating layer of white hollow spheres that will reflect radiative heat.

While metallic elements of the weighbridge 30 will be also subject to gaining heat from a loaded ladle transfer car 10 by both conduction and convection, the presence of a liquid pool in the foundation pit 32 will operate to keep the metallic elements cooler.

A weighing platform 40 is positioned in the foundation pit 32 so that the weight of the weighing platform bears on the base 34 and not on the side walls 36. The weighing platform 40 has a roadway 42 with a length, measured in the direction of the railway track 12, that exceeds a wheelbase of any ladle transfer car 10 that is used on it. An upper surface of the roadway 42 should be arranged in the foundation pit 32 to be at grade level for receiving a ladle transfer car being weighed. The roadway 42 should have a recessed set of railway rails for receiving the wheels of the ladle transfer car 10.

The weighing platform 40 is not directly connected to the railway track 12 that serves as an entry and an exit to the weighing platform, although the gap provided is sufficiently small that the ladle transfer cars 10 roll smoothly onto and off of the weighing platform.

The weighing platform 40 will generally have at least one set of beams 44 upon which the roadway 42 is supported and a plurality of vertical posts 46 positioned between the at least one set of beams and the base 34 of the foundation pit 32 to support the weighing platform. In the preferred embodiments, the beams 44 will remain above the liquid level in the foundation pit 32.

A plurality of load cells 50 are arranged in the foundation pit 32. Collectively, the entire weight of the weighing platform 40, including any load on the weighing platform, bears on these load cells 50. The load cells 50 are preferably positioned relatively low in the foundation pit 32, as this permits the load cells to remain submerged even if the level of the liquid in the foundation pit is reduced. The exact number of load cells 50 provided will depend in large part upon the amount of weight that each needs to bear. By keeping the load cells 50 at a relatively stable and uniform cool temperature during the weighing process, the accuracy of the ladle transfer car weighment is improved, and the reliability and availability of the weighbridge is increased.

Clearly, the presence of the liquid pool and the submersion of the load cells 50 in the foundation pit 32 indicates a need for load cells that have a high weight capacity, accuracy, and submersibility. As to submersibility, the load cells 50 should have a submersion ingress protection rating, such as IP68. The load cells 50 may be analog or digital, although there is a clear preference for a digital output signal. A few examples of such a load cell 50 are a POWERCELL PDX (Model SLC820) or a POWERCELL GDD (Model SLC720) load cell, commercially available from Mettler Toledo.

Each support post 46 should have at least one of the plurality of load cells 50 associated with it, assuring that all weight of the weighing platform is accounted for.

The load cells 50 are in electrical communication with a terminal 60 that receives input from the load cells and controls the weighing functions conducted. For safety reasons, and to permit a single terminal 60 to handle more than one weighbridge 30, the terminal and a human operator are preferably located remotely from the weighbridge. The remote location of the terminal 60 makes it highly preferred for the communication between the load cells and the terminal to be wireless and digital. The processing of a plurality of load cell inputs to establish a weight is well-known and a number of algorithms will be available to one of skill in the art.

The inventive concept is also embodied in a method for determining the weight of the molten metal in a ladle of a loaded ladle transfer car 10. To do this, a weighbridge 30 is provided, where the weighbridge has a foundation pit 32 with a base 34. There is at least one weighing platform 40 positioned in the foundation pit 32 with the entire weight of each weighing platform bearing on the base 34. A plurality of submersible load cells 50, especially load cells providing a digital output signal, especially a wireless signal, are arranged in the foundation pit 32 to collectively receive the total weight of all of the weighing platforms. The foundation pit 32 contains a liquid, preferably water, of sufficient depth to at least partially submerge each of the load cells 50. Preferably, the load cells are completely submerged.

A load of molten metal in a ladle of the ladle transfer car 10 is moved onto the weighbridge 30 so that the entire weight of the loaded ladle transfer car is borne by the plurality of the load cells 50. An output signal is transmitted from each of the plurality of load cells to a terminal 60 that is located remote from the weighbridge.

By known algorithms, a gross weight of the loaded ladle transfer car 10 is calculated from the digital input signals by subtracting a known weight of the weighing platforms. Further, by identifying the particular ladle transfer car 10 on the weighbridge 30, a weight of the ladle transfer car when not loaded may be recalled from a memory associated with the terminal 60 or the weight of the ladle transfer car when not loaded may be determined after discharging the load. By difference, the net weight of the molten metal may be determined.

Figure 2:
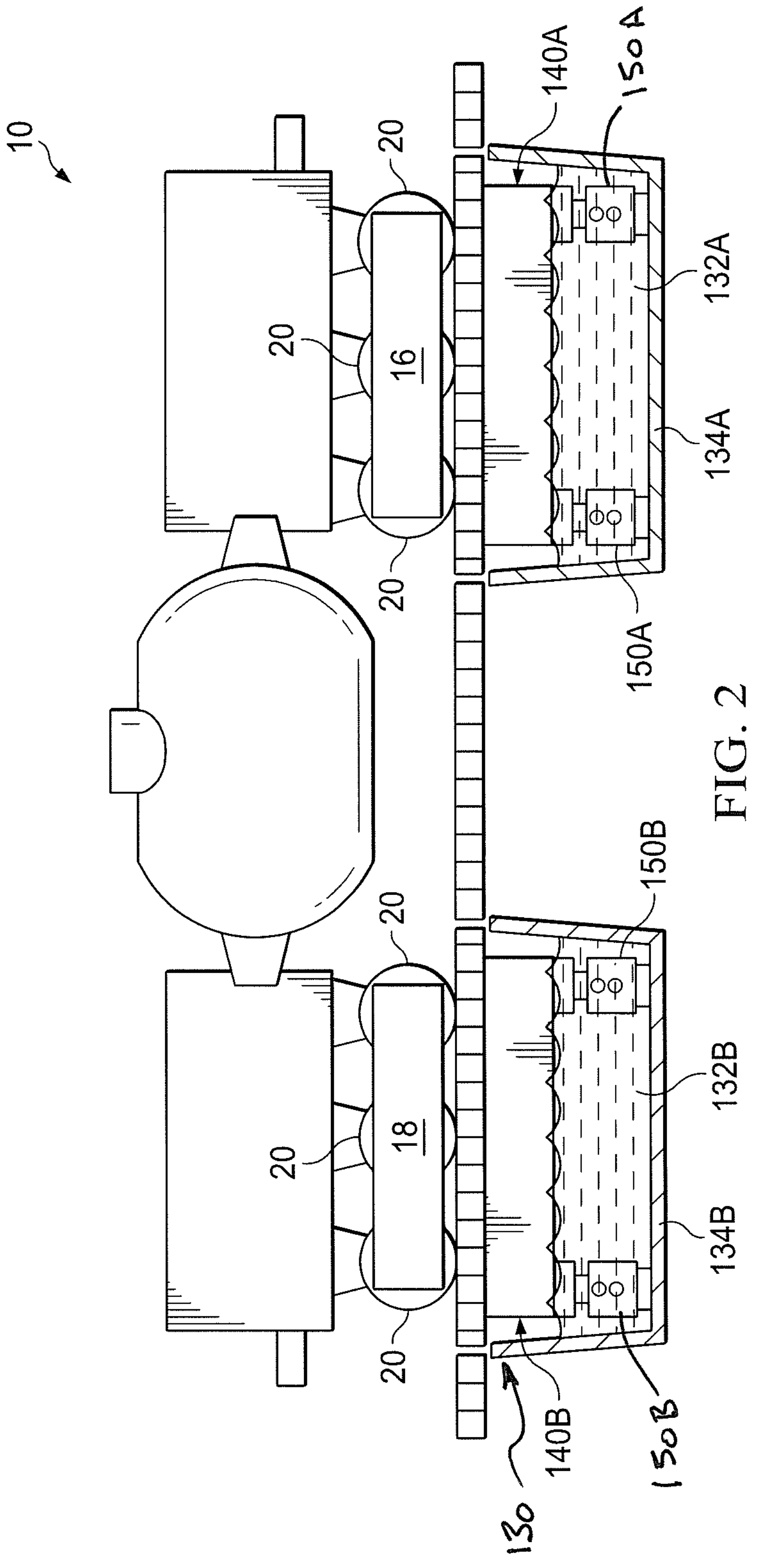
FIG. 2 is a side elevation view of the ladle transfer car, passing across a second embodiment of a weighbridge incorporating the inventive concept.

FIG. 2 shows an alternate embodiment 130 of a weighbridge for weighing a ladle transfer car 10 having a fore truck assembly 16 and a rear truck assembly 18. Each truck assembly 16, 18 has at least one axle bar with a pair of steel wheels. A fore weighing platform 140A and a rear weighing platform 140B are provided. The respective weighing platforms 140A, 140B are spaced apart to correspond to a spacing between the fore and rear truck assemblies 16, 18. Each weighing platform 140A, 140B is located in an associated foundation pit 132A, 132B, each of which has a base 134A, 134B. A plurality of load cells 150A are associated with weighing platform 140A and another plurality of load cells 150B are associated with weighing platform 140B. Each of the load cells is arranged below the associated weighing platform between a bottom surface of the weighing platform and the base of the associated foundation pit to measure the weight borne by the base from the associated weighing platform. Each foundation pit 132A, 132B contains a liquid, with a level thereof being maintained to fully or at least partially submerge each of the load cells. In some embodiments, the fore and rear foundation pits 132A, 132B are in selective liquid communication, that is, means is provided to selectively allow or prevent flow of liquid from one of the foundation pits to the other.

What is claimed is:

1. A weighbridge for weighing a ladle transfer car, the weighbridge comprising:
- a foundation pit, said foundation pit having a base;
- a weighing platform positioned in the foundation pit, bearing upon the base; and
- a plurality of load cells, arranged in the foundation pit such that, collectively, the load cells bear the weight of the weighing platform; and
- a system for filling, draining, and maintaining the quality and quantity of the liquid in the foundation pit;
- wherein, during use, the foundation pit contains a liquid, with a level thereof being maintained to at least partially submerge each of the load cells.

2. The weighbridge of claim 1, wherein:
- the liquid in the foundation pit is water.

3. The weighbridge of claim 1, wherein:
- each of the load cells is adapted for submersible use in the liquid.

4. The weighbridge of claim 1, wherein:
- during use, the level of liquid in the foundation pit is maintained below a bottom surface of the weighing platform.

5. The weighbridge of claim 1, wherein:
- each of the load cells provides a digital output signal.

6. The weighbridge of claim 5, further comprising:
- a terminal in electronic communication with each of the load cells for receiving the digital output signals for processing and for controlling the weighing functions.

7. The weighbridge of claim 6, wherein:
- the electronic communication is wireless.

8. The weighbridge of claim 1, wherein the weighing platform comprises:
- a roadway sized to receive the entire weight of the ladle transfer car being weighed;
- at least one set of beams upon which the roadway is supported; and
- a plurality of vertical posts positioned between the at least one set of beams and the base of the foundation pit to support the weighing platform.

9. The weighbridge of claim 8, wherein:
- each of the vertical posts has at least one of the plurality of load cells associated therewith.

10. The weighbridge of claim 8, wherein:
- an upper surface of the roadway is arranged in the foundation pit at grade level for receiving the ladle transfer car being weighed.

11. The weighbridge of claim 8, wherein:
- a pair of rails, recessed in the roadway, for receiving the ladle transfer car when the ladle transfer car is a rail car.

12. A weighing system for weighing a ladle transfer car having at least a fore truck assembly and a rear truck assembly, each truck assembly having at least one axle bar with a pair of steel wheels, the weighing system having a weighbridge comprising:
- a fore weighing platform and a rear weighing platform, spaced apart to correspond to a spacing between the fore truck assembly and rear truck assembly;
- a fore foundation pit and a rear foundation pit, each having a base and associated with a respective weighing platform; and
- a plurality of load cells associated with each of the weighing platforms, each of the load cells arranged below the associated weighing platform between a bottom surface of the weighing platform and the base of the associated foundation pit to measure the weight borne by the base from the weighing platform;
- wherein, during use, each foundation pit contains a liquid, with a level thereof maintained to fully or at least partially submerge each of the load cells;
- wherein the fore foundation pit and rear foundation pit are in selective liquid communication.

13. A method for weighing a ladle transfer car, comprising the steps of:
- providing a weighbridge having a foundation pit with a base, at least one weighing platform positioned in the foundation pit such that the weight of each weighing platform bears on the base, and a plurality of submersible load cells, arranged to collectively receive the total weight of all of the weighing platforms, wherein the foundation pit contains a liquid of sufficient depth to at least partially submerge each of the load cells;
- moving a ladle transfer car bearing a load of molten metal onto the weighbridge so that the entire weight of the loaded ladle transfer car is borne by the plurality of the load cells;
- transmitting an output signal from each of the plurality of load cells to a terminal remote from the weighbridge; and
- calculating, at the remote terminal, a weight of the molten metal in the loaded ladle transfer car based upon a weight of the ladle transfer car when not loaded.

14. The method of claim 13 wherein:
- the liquid is water.

* * * * *